United States Patent
Gluys et al.

[19]

[11] Patent Number: 6,102,180

[45] Date of Patent: Aug. 15, 2000

[54] PIN-TYPE SYNCHRONIZER

[75] Inventors: James D. Gluys, Portage; Timothy S. Smith, Marshall, both of Mich.

[73] Assignee: Eaton Corporation, Cleveland, Ohio

[21] Appl. No.: 09/017,993

[22] Filed: Feb. 3, 1998

Related U.S. Application Data

[63] Continuation-in-part of application No. 08/715,262, Sep. 16, 1996, Pat. No. 5,769,198.

[51] Int. Cl.[7] ...................................................... F16D 23/06
[52] U.S. Cl. ................................... 192/53.31; 192/53.332
[58] Field of Search ............................. 192/53.31, 53.33, 192/53.331, 53.332, 48.91; 74/339

[56] References Cited

U.S. PATENT DOCUMENTS

| | | | |
|---|---|---|---|
| 2,319,740 | 5/1943 | Lapsley et al. | 192/53.33 X |
| 3,078,975 | 2/1963 | Eaton | 192/53.332 |
| 3,419,121 | 12/1968 | Stott | 192/53.331 |
| 4,428,469 | 1/1984 | Morscheck et al. | 192/53.332 |
| 4,478,321 | 10/1984 | De Franco et al. | 192/53.332 |
| 4,989,706 | 2/1991 | Morscheck | 192/53.332 |
| 5,078,244 | 1/1992 | Olson . | |
| 5,092,439 | 3/1992 | Reynolds . | |
| 5,339,936 | 8/1994 | Lauer . | |
| 5,544,727 | 8/1996 | Braun | 192/48.91 |
| 5,558,194 | 9/1996 | Cox | 192/53.31 |
| 5,769,198 | 6/1998 | Gluys et al. | 192/53.31 |

*Primary Examiner*—Rodney H. Bonck
*Attorney, Agent, or Firm*—Paul S. Rulon; Howard D. Gordon

[57] ABSTRACT

A pin-type, double-acting synchronizer and gear assembly (10) with friction rings (26, 46 and 28, 48), jaw members (30, 38 and 32, 40) axially secured together by retainers (44), three circumferentially spaced pins (50) including blocker shoulders for preventing asynchronous engagement of the jaw clutches, and pre-energizer assemblies (52) to ensure initial engagement of the friction rings and blocker shoulders in response to initial engaging movement of a shift flange (42), and self-energizing ramps (20a–20d and 62a–62d). The assembly (10) includes improved jaw members and self energizing ramps, an improved shift flange, improved pre-energizers, and improved jaw member retainers. A second synchronizer and gear assembly embodiment (110) includes the above improvements plus an over stress reduction of splines 112g, 140 when gear 116 is connected to shaft 112.

15 Claims, 4 Drawing Sheets

PIN-TYPE SYNCHRONIZER

CROSS-REFERENCE TO RELATED APPLICATION

This application is a continuation-in-part of application Ser. No. 08/715,262 filed Sep. 16, 1996 now U.S. Pat. No. 5,769,198 and have the same assignee and inventors.

FIELD OF THE INVENTION

This invention relates to improvements a synchronizer for a transmission.

BACKGROUND OF THE INVENTION

It is well known in the multiple speed ratio transmission art that synchronizer mechanisms may be used to reduce shift time of all or some of the transmission gear ratios. It is also known that the shift effort required by a vehicle operator, i.e., force applied to a shift lever, may be reduced by use of synchronizer mechanisms of the self-energizing type. Since operator shift effort generally increases with vehicle size, synchronizer mechanisms of the self-energizing type are especially important for heavy duty trucks. Prior art examples of synchronizers that are relevant to the synchronizer herein may be seen by reference to U.S. Pat. Nos. 5,078,244; 5,092,439 and 5,339,936 which are incorporated herein by reference.

SUMMARY OF THE INVENTION

An object of this invention is to provide synchronizer having improved jaw member spline engagement.

According to the invention, a synchronizer and gear assembly, as disclosed in U.S. Pat. No. 5,092,439 and representing the prior art as referred to in the precharacterizing portion of claim 1, includes first and second gears disposed for rotation about a shaft having an axis. The first gear produces a greater drive torque to the shaft than the second gear. A hub is affixed to the shaft concentric to the axis and between the gears and has an axial length defined by axially oppositely facing first and second ends thereof respectively facing in the direction of the first and second gears. An outer circumference of the hub has external splines having an axial length substantially the same as the hub axial length. First and second jaw teeth are respectively affixed to each the first and second gears. First and second friction rings are respectively affixed to the first and second gears. Third and fourth friction rings are respectively movable into engagement with the first and second friction rings in response to a bi-directional axial shift force ($F_o$) for producing a synchronizing torque. Axially movable shift means include internal splines mating with the hub external splines and third and fourth jaw teeth respectively engagable with the first and second jaw teeth of the gears in response to engaging movement of the shift means from a neutral position by the shift force ($F_o$). Blocker means are movable into engagement in response to the engaging movement of the shift means for preventing asynchronous engagement of the jaw teeth and for transmitting the shift force ($F_o$) to the friction rings. First and second self-energizing means are respectively affixed to a part of the shift means and the hub and have ramp surfaces operative when engaged to react the synchronizing torque for producing an additive axial force ($F_a$) in the direction of the shift force ($F_o$) for increasing the engagement force of the engaged friction rings. The first self-energizing means have a first central portion and first and second of the ramp surfaces respectively facing axially on angles away from the central portion in the direction of the first and second gears, and the second self-energizing means have a second central portion and third and fourth of the ramp surfaces respectively extending away from the second central portion and respectively parallel to the first and second ramp surfaces. The central portions are circumferentially aligned during the neutral position of the shift means.

The improvement comprise the second central portion of the second self-energizing means disposed at a position axially closer to the hub end facing the second gear for providing a greater axial engaged length of the internal and external splines when the jaw teeth connecting the first gear to the shaft are engaged.

BRIEF DESCRIPTION OF THE DRAWINGS

The synchronizer and gear assemblies of the invention are shown in the accompanying drawings in which.

DETAILED DESCRIPTION OF THE DRAWINGS

The term "synchronizer", used herein, shall designate a clutch mechanism utilized to non-rotatably couple a selected ratio gear to a shaft by means of a positive clutch in which attempted engagement of the positive clutch is prevented until members of the positive clutch are brought to substantially synchronous rotation by a synchronizing friction clutch associated with the positive clutch. The term "self-energizing" shall designate synchronizer which includes ramps or cams or the like to increase the engaging force of the synchronizer in proportion to the synchronizing torque of the friction clutch.

Looking now at the drawings, therein is shown a synchronizer and gear assembly 10 including a shaft 12 to be mounted for rotation in a transmission about an axis 12a, axially spaced apart drives or gears 14, 16, and a double-acting synchronizer 22.

The shaft 12 includes cylindrical surfaces 12b, 12c rotatably supporting the gears thereon and an annular member 12d having an outer circumference greater in diameter than the diameters of the cylindrical surfaces. The annular member has an axial length separating the gears via axially oppositely facing shoulders 12e, 12f which limit axial movement of the gears toward each other. Axial movement of the gears away from each other is limited in any of several known manners. The annular member may be formed of a ring affixed to the shaft or, as herein, formed integral with the shaft. The outer circumference of the annular member includes external splines 12g formed therein and three recesses 18 of axial length equal to the axial length of the annular member and self-energizing ramps 20a, 20b, 20c, 20d, explained further hereinafter. The recesses totally remove several adjacent splines 12g, thereby simplifying machining of the self-energizing ramps.

Figure 3:
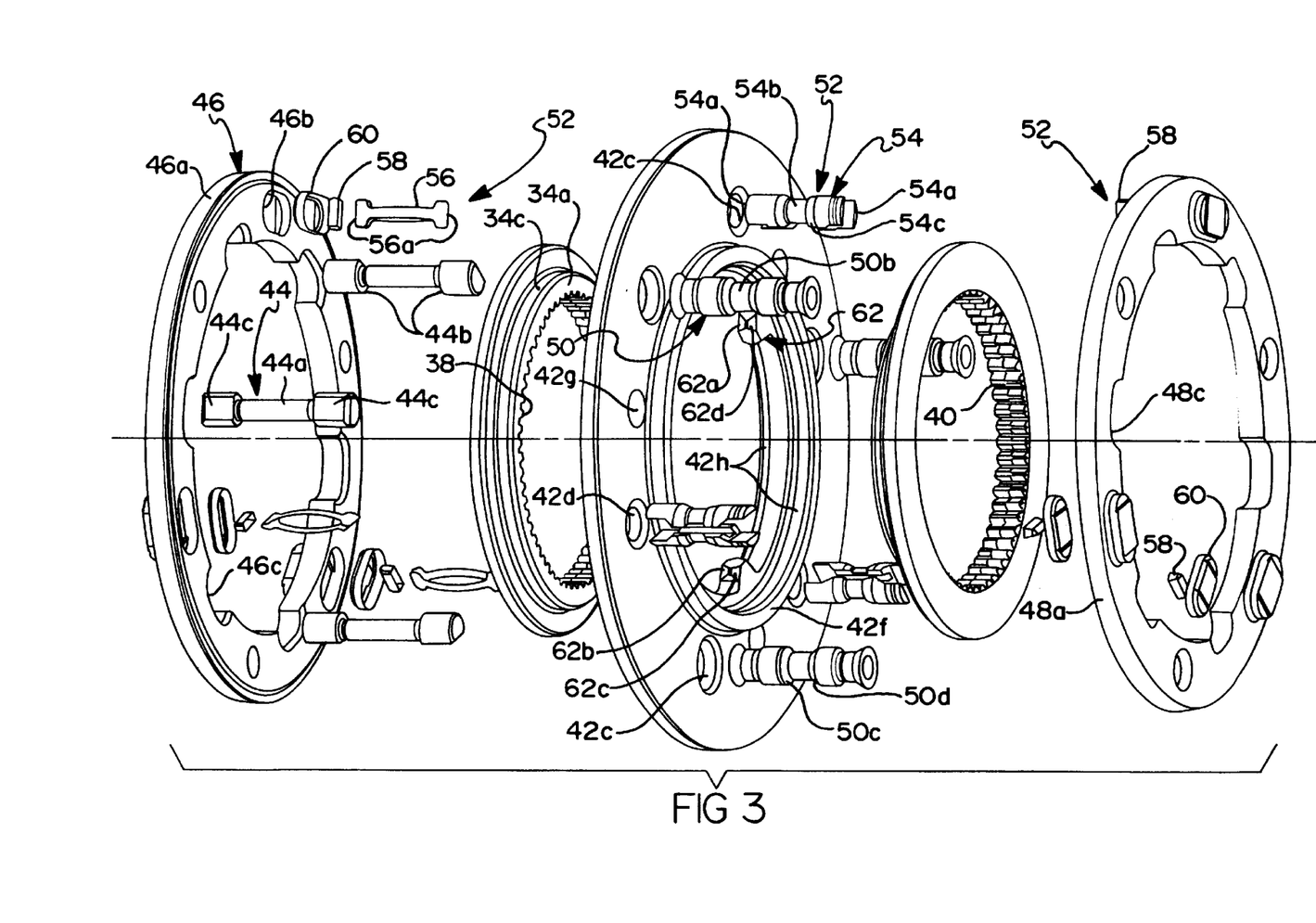
FIG. 3 is a detailed exploded view of parts of the synchronizer in FIG. 1.
Figure 4:
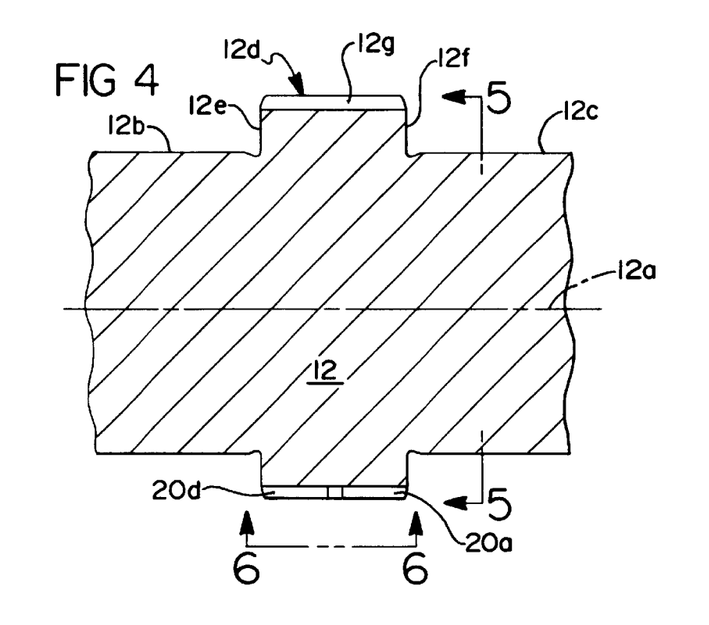
FIG. 4 is a detailed view of the portion of a shaft in FIG. 1.
Figure 5:
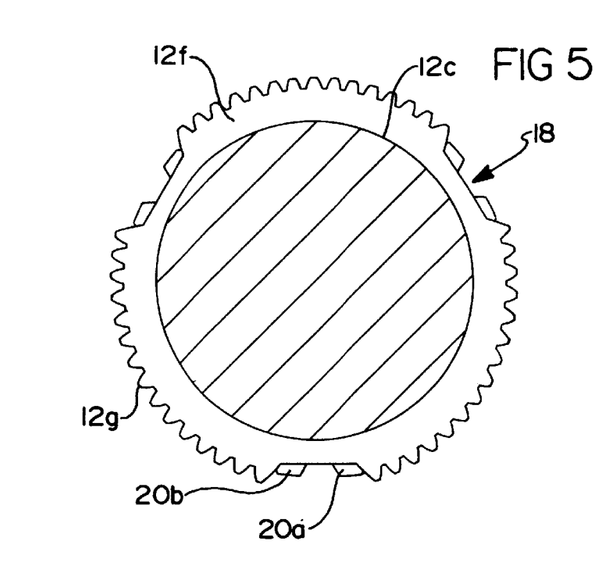
FIG. 5 is a sectional view of the shaft in FIG. 5 and looking along line 5—5 of FIG. 4.

The synchronizer 22 includes friction rings 26, 28 and jaw members 30, 32 integrally formed with gears 14, 16, jaw members 34, 36 having internal spline teeth 38, 40 slidably mating with the external spline teeth 12g formed in the outer circumference of annular member 12d, a radially extending shift flange 42 having axially oppositely facing sides 42a, 42b sandwiched between axially facing surfaces 34a, 36a of the jaw members 34, 36, three axially extending retainers 44 for securing the flange and jaw members against relative axial movement, annular friction rings 46, 48 rigidly secured together by three circumferentially spaced apart pins 50 extending axially from each of the friction members and through openings 42c in the flange, and three pre-energizer assemblies 52. Assemblies 52 are shown only in FIG. 3.

The friction rings have cone friction surfaces 26a, 46a and 28a, 48a that engage for frictionally synchronizing the gears to the shaft prior to engagement of the jaw members. Rings 46, 48 include three circumferentially spaced and axially opening recesses 46b, 48b elongated in the circumferential direction, and six circumferentially spaced and radially inwardly opening recesses 46c, 48c extending axially through friction ring 46, 48. The extra recesses 46c, 48c facilitate interchangeability of friction rings 46, 48. As explained further thereinafter, recess 46b, 48b receive ends of the pre-energizer assemblies and recess 46c, 48c receive retainers 44. A wide range of cone angles may be used; cone angles of seven and one-half degrees are employed herein. The friction surfaces 46a, 48a and/or 26a, 28a may be defined by any of several known friction materials affixed to the base member; herein, pyrolytic carbon friction materials, such as disclosed in U.S. Pat. Nos. 4,700,823; 4,844,218; and 4,778,548, are preferred. These patents are incorporated herein by reference.

Pins 50 each include major diameter portions 50a having diameters slightly less than the diameter of flange openings 42c, a reduced diameter or groove portion 50b spaced between friction rings 46, 48 (herein midway), and conical blocker shoulders or surfaces 50c, 50d extending radially outwardly from the pin axis and axially away from each other at angles relative to a plane normal to the pin axis. The grooved portions, when disposed within their respective flange openings, allow limited rotation of the rigid friction ring and pin assembly relative to the flange to effect engagement of the pin blocker shoulders with chamfered blocker shoulders defined about the flange openings 42c. The pins are secured to friction rings 46, 48 in any of several known manners.

The pre-energizer assemblies 52 are of the split pin-type shown and described more completely in previously mentioned U.S. Pat. No. 5,339,936. Each pre-energizer assembly extends axially between the friction rings 46, 48 and through opening 42d which are alternately spaced between opening 42c. Each pre-energizer assembly, shown only in FIG. 3, includes two identical shells 54, at least two identical leaf springs 56 sandwiched between and biasing the shells apart, two retainers 58 which telescope over ends 56a of the springs, and oblong cup-like members 60 disposed in the oblong recesses 46b, 48b in each friction ring 46, 48. The oblong cup-like members 60 and the recesses 46b, 48b are elongated in the circumferential direction of the friction rings and are of sufficient diameter in the radial direction of the friction rings to allow sliding movement of opposite ends 54a of the shells 54. Each pair of shells 54 has a major diameter less than the diameter of its associated opening 42d when squeezed together, semi-annular grooves 54b with chamfered end surfaces 54c, and the ends 54a. As is known, ends 54a react against friction rings 46, 48 and chamfers 54c react against chamfers about opening 42d in flange 42 in response to initial engaging movement of flange 42. The cup-like members 60 rigidly interface between friction rings 46, 48 and the ends 54a to provide a wear resistant material therebetween. For example the cup-like members may be made of steel and the friction rings may be made of aluminum or some other relatively soft material.

As previously mentioned, jaw members 34, 36 include internal spline teeth 38, 40 slidably mating with external spline teeth 12d affixed to the shaft. The external splines have flank surfaces extending parallel to the shaft axis, and the mating thereof with flank surfaces of the jaw member splines prevents relative rotation therebetween.

Flange 42 further includes annular stiffener rings 42e, 42f extending axially from opposite sides thereof and self-energizing teeth 62 projecting radially inward into the recesses 18 in the outer circumference of shaft annular member 12d. Each tooth 62 includes self-energizing surfaces 62a, 62b, 62c, 62d which cooperate or react against the self-energizing ramp surfaces 20a, 20b, 20c, 20d, respectively. Each stiffener ring includes a radially inwardly facing surface 42h receiving a annular radially outwardly facing surface 34c, 36c of the jaw members 34, 36. The stiffener rings reduce axial distortion of flange 42 during manufacture and while in use. The ramp surfaces allow limited rotation of the flange relative to jaw members 34, 36 and shaft 12, and react synchronizing torque between the cone clutches and shaft to provide an additive axial self-energizing force for increasing the engaging force of the cone clutch initially engaged by a shift force applied to flange 42, thereby increasing the synchronizing torque provided by the cone clutch. The ramp surfaces may be provided for increasing synchronizing force for one or both gears and/or for increasing synchronizing force in response to torque in either direction, as is encountered for up and down shifts.

The retainers 44 each include an axially extending portion 44a disposed about radially outward portions 34b, 36b of jaw members 34, 36 and axially spaced apart and radially inwardly extending portions 44b embracing axially oppositely facing portions 34b', 36b' of jaw members 34, 36. The retainers loosely extend through opening 42g in flange 42 for allowing limited relative rotation therebetween. Each axially extending portion has axially spaced apart and radially outwardly facing portions 44c received in friction ring recesses 46c, 48c and in relatively close sliding relation with radially inwardly facing portions of the recesses. Portions 44c are long enough to remain in sliding relation with the inwardly facing portions of the recesses. Gears 14, 16 include axially extending recesses 14a, 16a for receiving end portions of the retainers when the jaw members are engaged. See FIG. 2. The radially extending sides of recesses 46c, 48c maintain circumferential spacing of the retainers. Ramp surfaces 20a, 20b affixed to shaft 12 respectively react against ramp surfaces 62a, 62b on flange teeth 62 to provide additive axial forces to increase or assist the synchronization rate and/or shift quality of gear 16 in response to torque in either direction. Ramp surfaces 20c, 20d respectively react against ramp surfaces 62c, 62d to provide the additive axial forces for gear 14 in response to synchronizing torque in either direction. The angles of the ramp surfaces may be varied to provide different amounts of additive axial force for up and down shifts and for high and low speed ratios. Also, if no additive axial force is preferred in one direction for one gear or more, the ramp surfaces may be parallel to the shaft axis, i.e., no effective ramp surfaces are provided. The magnitude or amount of the axial additive forces, as explained further hereinafter, is also a function of the mean radii ratio of friction clutches and self-energizing ramps. Accordingly, the magnitude of the additive forces for a given shift force applied to shift flange 42 by a shift fork may be varied by varying the ramp angles and/or the mean radii ratio.

Figure 1:
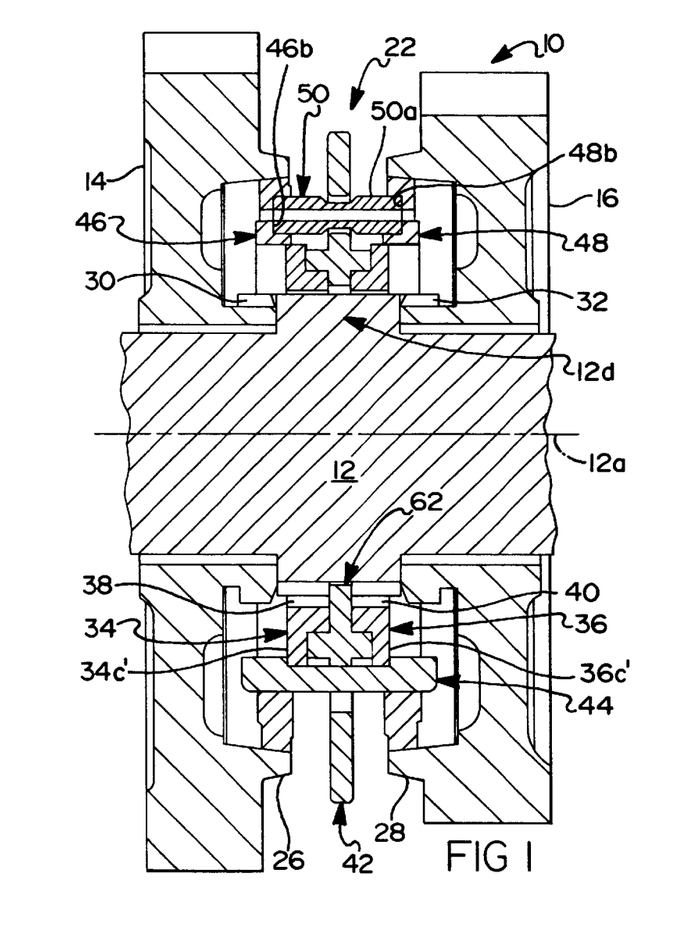
FIG. 1 is a sectional view of a somewhat schematically illustrated double-acting synchronizer and gear assembly in a neutral position.

When the flange 42 is in the neutral position of FIG. 1, reduced diameter portions 50b of pins 50 are radially aligned with their associated flange openings 42c, friction surfaces of the cone clutches are slightly spaced apart and are maintained in this spaced relation by chamfered or angled pre-energizer surfaces 54c of the pre-energizers 52 acting on pre-energizer chamfered surfaces about flange openings 42d by the force of springs 56. The axial force provided by the pre-energizer surface is preferably sufficient to counter act any additive axial force on flange 42 by the self-energizing ramps due to viscous shear of oil between the cone clutch surfaces. When it is desired to couple either gear to the shaft, an appropriate and unshown shift mechanism, such as disclosed in U.S. Pat. No. 4,920,815 and incorporated herein by reference, is connected to the outer periphery of flange 42 in known manner for moving the flange axially along the axis of shaft 12 either left to couple gear 14 or right to couple gear 16. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, the force is proportional to the force applied by the operator to a shift lever. Whether manually or automatically applied, the force is applied to flange 42 in an axial direction and is represented by the length of arrow $F_o$ in FIG. 7.

Figure 2:
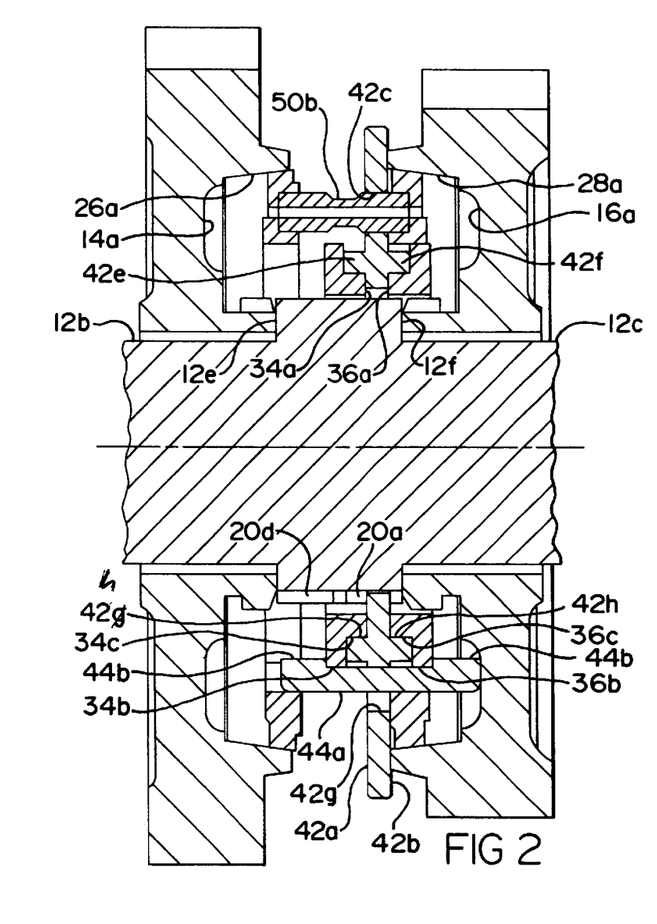
FIG. 2 is the synchronizer of FIG. 1 engaged rightward.
Figure 8:
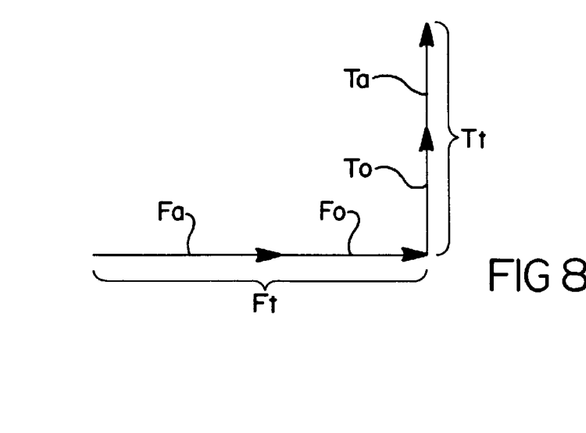
FIG. 8 is a graphical representation of axial forces and torques acting on a shift flange of the synchronizer.

Initial rightward axial movement of flange 42 by the operator shift force $F_o$ is transmitted to pins 50 by pre-energizer surfaces 54c to effect initial frictional engagement of cone surface 48a with cone surface 28a. The initial engagement force of the cone surface is of course a function of the force of springs 56 and the angles of the pre-energizer surfaces. The initial frictional engagement (provided an asynchronous condition exists and momentarily ignoring the effect of the self-energizing ramps) produces an initial cone clutch engaging force and synchronizing torque $T_o$ which ensures limited relative rotation between flange 42 and the engaged friction ring, and hence, movement of the reduced diameter pin portions 50b to the appropriate sides of the flange openings 42c to provide engagement of pin blocker shoulders 50d with the blocker shoulders disposed about openings 42c. When the blocker shoulders are engaged, the full operator shift force $F_o$ on flange 42 is transmitted to friction ring 48 via the blocker shoulders, whereby the cone clutch is engaged by the full force of the operator shift force $F_o$ to provide a resultant operator synchronizing torque $T_o$. This operator synchronizing torque $T_o$ is represented by arrow $T_o$ in FIG. 8. Since the blocker shoulders are disposed at angles relative to the axial direction of operator shift force $F_o$, they produce a counter force or unblocking torque which is counter to the synchronizing torque from the cone clutch but of lesser magnitude during asynchronous conditions. As substantial synchronism is reached, the synchronizing torque drops below the unblocking torque, whereby the blocker shoulders move the pins into concentric relation with openings 42c to allow continued axial movement of the flange and engagement of the internal spline/jaw teeth 40 of jaw member 36 with external spline/jaw teeth of jaw member 32, as shown in FIG. 2. The spline/jaw teeth may be configured as shown in U.S. Pat. Nos. 3,265,173 and 4,246,993 which are incorporated herein by reference.

Still ignoring the effects of the self-energizing ramps, cone clutch torque provided by the force $F_o$ is expressed by equation (1).

$$T_o = F_o R_c \mu_c / \sin\alpha \tag{1}$$

where:

$R_c$=the mean radius of the cone friction surface, $\mu_c$=the coefficient of friction of the cone friction surface, and $\alpha$=the angle of the cone friction surfaces.

Figure 6:
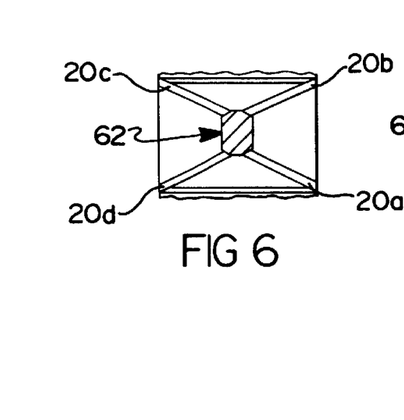
FIGS. 6 and 7 are views of a portion of the shaft in FIG. 4 looking along line 6—6 of FIG. 4 and having mating self-energizing ramps of FIG. 3 added thereto.
Figure 7:
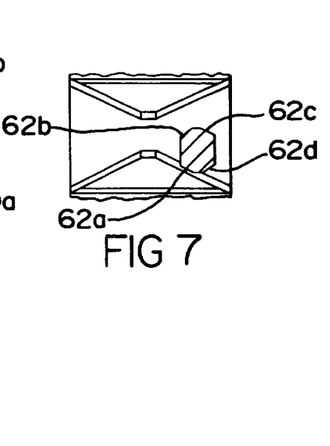

Looking now at the affects of the self-energizing ramps and referring particularly to FIGS. 6 and 7, the synchronizing torque $T_o$, due to the operator applied axial shift force $F_o$, is of course transmitted to flange 42 by pins 50 and is reacted to shaft 12 across the self-energizing ramp surfaces. The self-energizing ramp surfaces, when engaged, limit rotation of the flange relative to shaft 12 and jaw members 34, 36, and produce an axial force component or axial additive force $F_a$ acting on the flange in the same direction as shift force $F_o$, which forces sum to provide a total force $F_t$, thereby further increasing the engaging force of the cone clutch to provide an additive synchronizing torque $T_a$ which adds to the torque $T_o$ to provide a total torque $T_t$. FIG. 6 illustrates the position of the self-energizing ramp surfaces while shift flange 42 is in the neutral position corresponding to the position of FIG. 1. FIG. 7 illustrates a position of the ramps and splines while gear 16 is being synchronized by engaged cone surfaces 28a, 48a. The engaged cone surfaces are producing a synchronizing torque in a direction which has effected engagement of flange ramp surfaces 62a with shaft ramp surfaces 20a. Hence, the sum of the axial forces for engaging the cone clutch are $F_o$ plus $F_a$ and the sum of the synchronizing torques being produced by the cone clutch are $T_o$ plus $T_a$, as graphically shown in FIG. 8. For a given operator shift force $F_o$ and an operator synchronizing torque $T_o$, the magnitude of the axial additive force is preferably a function of the angle of the engaged self-energizing ramp surfaces. This angle is preferably great enough to produce an additive force $F_a$ of magnitude sufficient to significantly increase synchronizing torque and decrease synchronizing time in response to a given moderate shift effort by the operator. However, this angle is also preferably low enough to produce a controlled axial additive force $F_a$, i.e., the force $F_a$ should increase or decrease in response to the force $F_o$ increasing or decreasing. If the ramp angle is too great, the ramps are self-locking rather than self-energizing; hence, once initial engagement of the cone clutch is effected the force $F_a$ will rapidly and uncontrollably increase independent of the force $F_o$, thereby driving the cone clutch toward uncontrolled lockup. Self-locking rather than self-energizing decreases shift quality or shift feel, may over stress synchronizer components, may cause over heating and rapid wear of the cone clutch surfaces, and may even override operator movement of the shift lever.

The main variables and equations for calculating self-energizing ramp angles may be seen by reference to previously mentioned U.S. Pat. No. 5,092.439.

Figure 9:
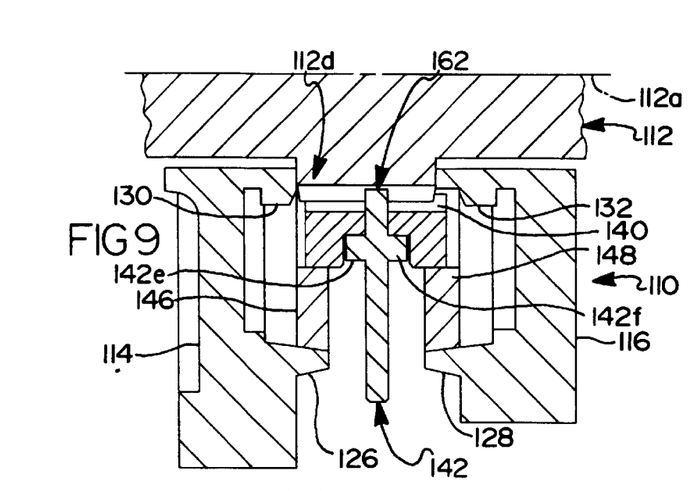
FIGS. 9–11 illustrate an alterative embodiment of the synchronizer and gear assembly showing the lower vertical half thereof in a neutral position and right and left engaged positions.
Figure 10:
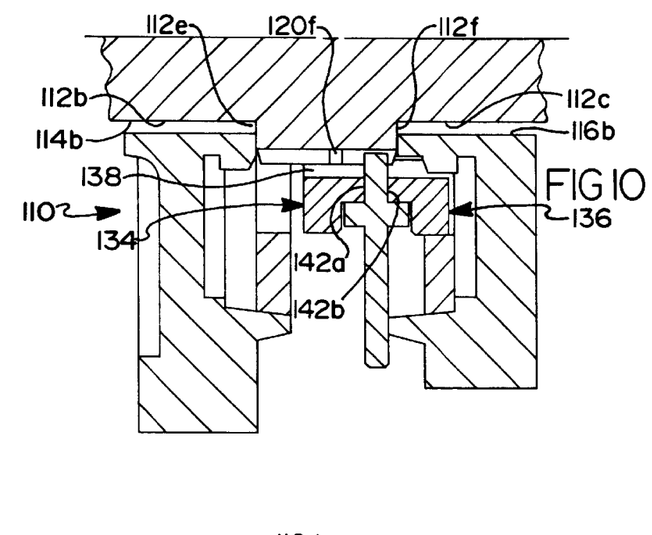
Figure 11:
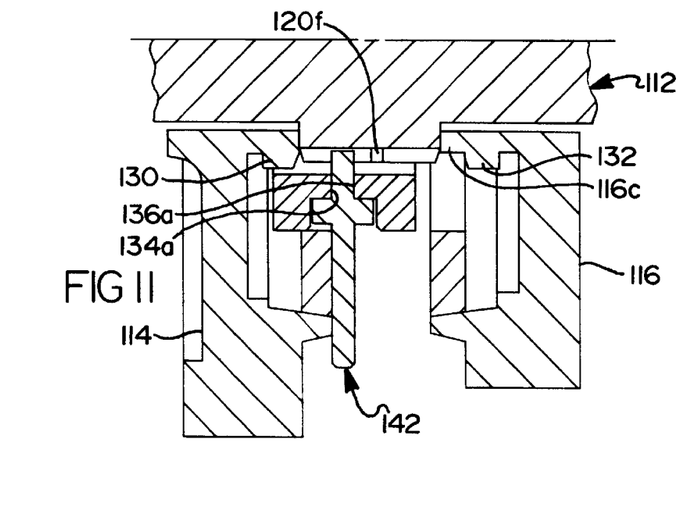
Figure 12:
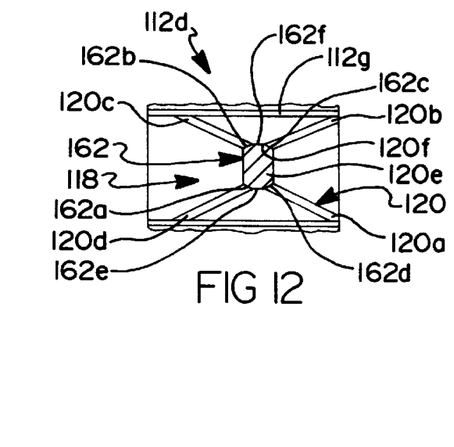
FIG. 12 a hub portion for the alterative embodiment.

Looking now at the alterative embodiment illustrated in FIGS. 9–12, therein is shown in FIGS. 9–11 the lower vertical half of a synchronizer and gear assembly 110 and in FIG. 12 an annular member/hub 112d that differs from annular member/hub 12d by being asymmetric relative to the axial position of the self-energizing means 120. Hub 112d is substantially the same length as hub 12d and may or may not have self-energizing ramps of the same angles. The principal difference between the embodiments 10 and 110 is concerned mainly with the asymmetric features of hub 112d to facilitate maintaining symmetry of the synchronizer parts as explained further hereinafter.

Synchronizer and gear assembly 110 including a shaft 112 to be mounted for rotation in a transmission about an axis 112a and axially spaced apart drives or gears 114, 116. The shaft 112 includes cylindrical surfaces 112b, 112c rotatably supporting inner cylindrical bearing surfaces 114b, 116b the gears thereon by unshown bearings and an annular member or hub 112d having an outer circumference greater in diameter than the diameters of the shaft cylindrical surfaces. The hub has an axial length separating the gears via axially oppositely facing shoulders 112e, 112f which limit axial movement of the gears toward each other. Axial movement of the gears away from each other is limited in any of several known manners. The hub may be formed of a ring affixed to the shaft or, as herein, formed integral with the shaft. The outer circumference of the hub includes external splines 112g formed therein and three recesses 118 of axial length equal to the axial length of the hub and self-energizing means 120 including ramps 120a, 120b, 120c, 120d. Ramps 120a, 120d are positioned on one side of each recess and face axially on angles away from a central portion 120e in the direction of gears 116, 114, respectively. Ramps 120b, 120c are positioned on the other side of each recess and face axially on angles away from a central portion 120f in the direction of gears 116, 114, respectively. Each recess may be formed in lieu of several adjacent splines 12g as in assembly 10, thereby simplifying machining of the self-energizing ramps.

Herein friction rings 146, 148 and jaw members 130, 132 integrally formed with gears 114, 116, jaw members 134, 136 have internal spline teeth 138, 140 slidably mating with the external spline teeth 112g formed in the outer circumference of hub 112d, and a radially extending shift flange 142 has axially oppositely facing sides 142a, 142b sandwiched between axially facing surfaces 134a, 136a of the jaw members 134, 136. FIGS. 9–11 are sectioned such that several of the components shown in FIGS. 1 and 2 need not be shown. These unshown components include the retainers securing the flange and jaw members against relative axial movement, the three circumferentially spaced apart pins rigidly securing annular friction rings 146, 148 together and extending axially from through openings in the flange, the three pre-energizer assemblies, etc.

As previously mentioned, jaw members 134, 136 include internal spline teeth 138, 140 slidably mating with external spline teeth 112d affixed to shaft 112. The external splines have flank surfaces extending parallel to the shaft axis, and the mating thereof with flank surfaces of the jaw member splines prevents relative rotation therebetween.

Flange 142 further includes annular stiffener rings 142e, 142f extending axially from opposite sides thereof and self-energizing teeth 162 projecting radially inward into the recesses 118 in the outer circumference of hub 112d. Each tooth 162 includes self-energizing surfaces 162a, 162b, 162c, 162d which cooperate or react against the self-energizing ramp surfaces 120a, 120b, 120c, 120d, respectively. Ramps 162a, 162d extend away from a central or stop portion 162e respectively parallel to ramp surfaces 120a, 120d. Ramps 162b, 162c extend away from a central or stop portion 162f respectively parallel to ramp surfaces 120b, 120c. The ramp surfaces allow limited rotation of the flange relative to jaw members 134, 136 and shaft 112, and react synchronizing torque between the cone clutches and shaft to provide an additive axial self-energizing force for increasing the engaging force of the cone clutch initially engaged by a shift force applied to flange 142, thereby increasing the synchronizing torque provided by the cone clutch. The ramp surfaces may be provided for increasing synchronizing force in response to torque in either direction, as is encountered for up and down shifts.

Ramp surfaces 120a, 120b affixed to hub 112d respectively react against ramp surfaces 162a, 162b on flange teeth 162 to provide additive axial forces to increase or assist the synchronization rate and/or shift quality of gear 116 in response to torque in either direction. Ramp surfaces 120c, 120d respectively react against ramp surfaces 162c, 162d to provide the additive axial forces for gear 114 in response to synchronizing torque in either direction.

When the flange 142 is in the neutral position of FIG. 9, central portions 120e, 120f, 162e, 162f are circumferentially aligned for circumferential contact as shown in FIG. 12. Such contact prevents inadvertent engagement of the self-energizing ramp surfaces due to speed change or viscous drag between the friction surfaces. When it is desired to couple either gear to the shaft, an appropriate and unshown shift mechanism, as previously mentioned, is connected to the outer periphery of flange 142 in known manner for moving the flange axially along the axis of shaft 112 either left to couple gear 14 or right to couple gear 16.

As may be seen in the engaged jaw clutch positions of FIGS. 10 and 11, the asymmetric or axially offset position of the hub self-energizing means 120 provides increased axial engagement of internal and external splines 138, 112g relative to splines 140, 112g when the gears are connected to the shaft. This increased engagement is accomplished without increasing the axial length of hub 112d relative to hub 12d, without increasing the axial shift stroke of flange 142 relative to flange 42, and without loss of axial length of engagement of internal and external spines 140, 112g relative to splines 40, 12g.

The above improvement is accomplished by equally increasing the axial length of jaw members 134, 136 and their internal splines 138, 140 relative to the comparable jaw members and splines in assembly 10, by moving second gear jaw teeth 132 axially away from end 112f of the hub and maintaining an integral annular portion between teeth 132 and end 112f. Annular portion 116c maintains gear bearing surface 116b equal to the comparable bearing surface of gear 16 thereby providing the same amount of bearing support without increasing the axial length of gear 116 relative to gear 16.

The following claims are intended to cover inventive portions of the disclosed synchronizers and variations and modifications believed to be within the spirit of the invention.

What is claimed is:

1. A synchronizer and gear assembly comprising:
   first and second gears disposed for rotation about a shaft having an axis, the first gear for producing a greater drive torque to the shaft than the second gear;
   a hub affixed to the shaft concentric to the axis and between the gears and having an axial length defined by axially oppositely facing first and second ends thereof respectively facing in the direction of the first and second gears, an outer circumference of the hub having external splines having an axial length substantially the same as the hub axial length;

first and second jaw teeth respectively affixed to each the first and second gears;

first and second friction rings respectively affixed to the first and second gears, and third and fourth friction rings respectively movable into engagement with the first and second friction rings in response to a bidirectional axial shift force ($F_o$) for producing a synchronizing torque;

axially movable shift means including internal splines mating with the hub external splines and having third and fourth jaw teeth respectively engagable with the first and second jaw teeth of the gears in response to engaging movement of the shift means from a neutral position by the shift force ($F_o$);

blocker means movable into engagement in response to the engaging movement of the shift means for preventing asynchronous engagement of the jaw teeth and for transmitting the shift force ($F_o$) to the friction rings;

first and second self-energizing means respectively affixed to a part of the shift means and the hub and having ramp surfaces operative when engaged to react to the synchronizing torque for producing an additive axial force ($F_a$) in the direction of the shift force ($F_o$) for increasing the engagement force of the engaged friction rings, the first self-energizing means having a first central portion and first and second of the ramp surfaces respectively facing axially on angles away from the central portion in the direction of the first and second gears, and the second self-energizing means having a second central portion and third and fourth of the ramp surfaces respectively extending away from the second central portion and respectively parallel to the first and second ramp surfaces, the central portions circumferentially aligned during the neutral position of the shift means; the improvement comprising:

the second central portion of the second self-energizing means disposed at a position axially closer to the hub second end facing the second gear for providing a greater axial engaged length of the internal and external splines when the jaw teeth connecting the first gear to the shaft are engaged.

2. The synchronizer and gear assembly of claim 1, wherein:

the third and fourth jaw teeth having axially oppositely facing ends facing respectively toward the first and second gears, the third jaw teeth ends positioned between the hub first end second ends when the shift means is in the neutral position, and the fourth jaw ends are positioned between the hub second end and the jaw teeth affixed to the second gear when the shift means is in the neutral position.

3. The synchronizer and gear assembly of claim 1, wherein:

the outer circumference of the hub includes at least one recess of axial length equal to said hub axial length; and said second self-energizing means defined in the recess.

4. The synchronizer and gear assembly of claim 3, wherein:

the external splines affixed to the hub have a radially inner radius; and said second central portion and third and fourth ramp surfaces have radially outer and inner radii and the radially outer radius less than or equal the radially inner radius of the external splines.

5. The synchronizer and gear assembly of claim 4, wherein:

the first self-energizing means includes a third central portion and fifth and sixth ramp surfaces respectively facing axially on an angle away from the third central portion and in the direction of the first and second gears, and the second self-energizing means has a fourth central portion and seventh and eight ramp surfaces respectively extending away from the fourth central portion and respectively parallel to the fifth and sixth ramp surfaces, the third and fourth central portions circumferentially aligned during the neutral position of the flange.

6. The synchronizer and gear assembly of claim 1, wherein:

the first self-energizing means mounted for limited rotation relative to the hub, for non-axial movement relative to the third and fourth jaw teeth, and for transmitting the additive axial force ($F_a$) to the friction rings via the blocker means.

7. The synchronizer and gear assembly of claim 1, wherein:

the shift means includes a radially extending flange secured against axial movement relative to the third and fourth jaw teeth;

the blocker means includes a plurality of circumferentially spaced apart pins rigidly extending between the third and fourth friction rings and through openings in the flange, each pin having a blocker shoulder engagable with a blocker shoulder defined about the associated opening;

the first self-energizing means affixed to the flange and allowing limited rotation of the flange relative to the hub.

8. The synchronizer and gear assembly of claim 7, wherein:

the outer circumference of the hub includes at least one recess of axial length equal to said hub axial length; and said second self energizing means defined in the recess.

9. The synchronizer and gear assembly of claim 8, wherein:

the external splines affixed to the hub have a radially inner radius; and said second central portion and third and fourth ramp surfaces have radially outer and inner radii and the radially outer radius less than or equal the radially inner radius of the external splines.

10. The synchronizer and gear assembly of claim 9, wherein:

the first self-energizing means includes a third central portion and fifth and sixth ramp surfaces respectively facing axially on an angle away from the third central portion and in the direction of the first and second gears, and the second self-energizing means has a fourth central portion and seventh and eight ramp surfaces respectively extending away from the fourth central portion and respectively parallel to the fifth and sixth ramp surfaces, the third and fourth central portions circumferentially aligned during the neutral position of the flange.

11. A synchronizer and gear assembly comprising:

first and second gears disposed for rotation about a shaft having an axis, the first gear for producing a greater drive torque to the shaft than the second gear;

a hub affixed to the shaft concentric to the axis and between the gears and having an axial length defined by axially oppositely facing first and second ends thereof respectively facing in the direction of the first and second gears, an outer circumference of the hub having external splines having an axial length substantially the same as the hub axial length;

first and second jaw members affixed respectively to the first and second gears, and respectively engagable with axially movable third and fourth jaw members positioned between the gears, the third and fourth jaw members having internal splines slidably mating for non-relative rotation with hub external splines;

first and second friction rings respectively secured for rotation with the first and second gears and third and fourth friction rings concentric to the shaft and axially movable between the gears for frictional engagement respectively with the first and second friction rings to provide a synchronizing torque for synchronizing the gears with the shaft;

a radially extending flange having axially oppositely facing sides positioned between the third and fourth jaw members and between the third and fourth friction rings for axially moving the jaw members and rings into said engagement in response to an axial bidirectional shift force ($F_o$) applied to the flange, the flange mounted for limited rotation relative to the hub;

blocker means operative when engaged for preventing engagement of the jaw members prior to the synchronizing, the blocker means including a plurality of circumferentially spaced apart pins rigidly extending axially between the third and fourth friction rings and into a first set of openings in the flange, each of the pins having a blocker shoulder engagable with a blocker shoulder defined about the associated opening;

first means securing the flange against axial movement relative to the third and fourth jaw members;

first and second self-energizing means respectively affixed to the flange and the hub and having ramp surfaces operative when engaged to react the synchronizing torque for producing an additive axial force ($F_a$) in the direction of the shift force ($F_o$) for increasing the engagement force of the engaged friction rings, the first self-energizing means having a first central portion and first and second of the ramp surfaces respectively facing axially on an angle away from the central portion and in the direction of the first and second gears, and the second self-energizing means having a second central portion and third and fourth of the ramp surfaces respectively extending away from the second central portion and respectively parallel to the first and second ramp surfaces, the central portions circumferentially aligned during the neutral position of the shift means; the improvement comprising:

the second central portion of the second self-energizing means disposed at a position axially closer to the hub second end facing the second gear for increasing the length of the engaged internal and external splines when the jaw members connecting the first gear to the shaft are engaged.

12. The synchronizer and gear assembly of claim 11, wherein:

the third and fourth jaw members having axially oppositely ends respectively facing the first and second gears, the third jaw member end positioned between the hub first and second ends when the shift means is in the neutral position, and the fourth jaw member end positioned between the hub second end and the jaw teeth affixed to the second gear.

13. The synchronizer and gear assembly of claim 11, wherein:

the outer circumference of the hub includes at least one recess of axial length equal to said hub axial length; and said second self energizing means defined in the recess.

14. The synchronizer and gear assembly of claim 13, wherein:

the external splines affixed to the hub have a radially inner radius; and said second central portion and third and fourth ramp surfaces have radially outer and inner radii and the radially outer radius less than or equal the radially inner radius of the external splines.

15. The synchronizer and gear assembly of claim 14, wherein:

the first self-energizing means includes a third central portion and fifth and sixth ramp surfaces respectively facing axially on an angle away from the third central portion and in the direction of the first and second gears, and the second self-energizing means has a fourth central portion and seventh and eight ramp surfaces respectively extending away from the fourth central portion and respectively parallel to the fifth and sixth ramp surfaces, the third and fourth central portions circumferentially aligned during the neutral position of the flange.

\* \* \* \* \*